3,216,924
PROCESS FOR THE HYDROGENATION OF AN UNSATURATED HYDROCARBON
Joel D. McKinney, Indiana Township, Allegheny County, Pa., Theodore Rice, Beaumont, Tex., and Eldon M. Sutphin, O'Hara Township, Allegheny County, Pa., assignors to Gulf Research & Development Company, Pittsburgh, Pa., a corporation of Delaware
Filed Jan. 31, 1963, Ser. No. 255,367
20 Claims. (Cl. 208—143)

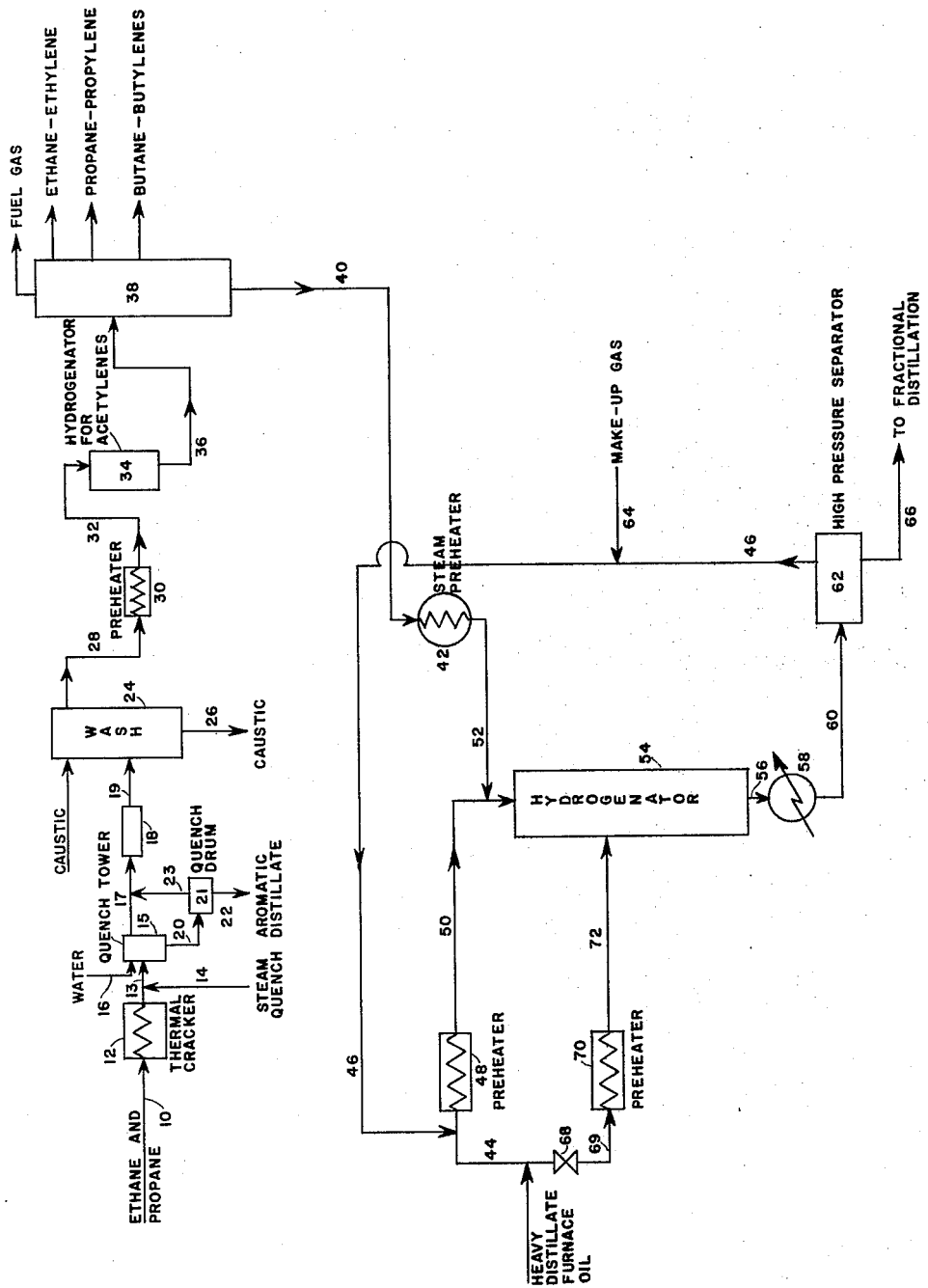

This invention relates to an improved process for catalytic treatment of unsaturated compounds which readily thermally polymerize.

Since the efficient catalytic conversion of most hydrocarbons by, for example, hydrogenation or cracking occurs at temperatures exceeding 300° F., it is usually desirable to preheat the charge stock to temperatures exceeding 300° F. This preheating normally occurs by indirect heating in conventional shell and tube heat exchangers or tubular furnaces. By indirect heating is meant the transferrence of heat from one fluid to another while a solid barrier is maintained between the fluids. It has been found, however, that there are certain unsaturated compounds, such as, for example, acetylenes and aliphatic and cyclic diolefins and triolefins which readily thermally polymerize even at temperatures as low as about 300° F. As a consequence of this, the preheating prior to catalytic conversion of charge stocks comprising as little as about 6 percent by weight of these unsaturated compounds by indirect heating in conventional shell and tube heat exchangers or tubular furnaces to a temperature exceeding about 260° F. results in unwanted polymer formation with a consequent fouling of the preheating equipment and/or transfer lines. This difficulty necessitates the undesirably frequent cleaning of the heat transfer equipment.

It has now been found that this difficulty can be overcome by the simple expedient of preheating the charge stock comprising between about 6 and about 60 percent by weight of unsaturated compounds which readily thermally polymerize to a temperature less than about 260° F.; and admixing a preheated refractory material with the preheated charge stock to further increase the temperature of the charge stock by direct heat transfer just prior to contacting the preheated charge stock with a catalyst mass in a catalytic conversion zone so that both the preheated charge stock and refractory material in admixture contact the catalyst mass in the catalytic conversion zone. The refractory material is preheated to a temperature higher than the temperature of the preheated charge stock, the amount and temperature of the refractory material being sufficient to increase the temperature of the admixture to between 300° F. and 500° F.

The charge stock for the process of this invention comprises any mixture of compounds comprising between about 6 and about 60 percent by weight of unsaturated compounds which readily thermally polymerize and about 40 to about 94 weight percent of diluent compounds which do not readily thermally polymerize. By an unsaturated compound which readily thermally polymerizes is meant any compound which has a potential gum value of over 500 milligrams per 100 milliliters of compound after 5 hours by ASTM test D–873. Examples of unsaturated compounds which readily thermally polymerize include poly unsaturated organic acids, thio-acetylenes, diolefinic amines and unsaturated hydrocarbons, such as acetylenes, vinyl substituted aromatics and aliphatic and cyclic di- and triolefins. The readily thermally polymerizable unsaturated hydrocarbons which comprise the charge stock for the process of this invention preferably have between 2 and 20 carbon atoms per molecule with the more preferred charge stocks comprising readily thermally polymerizable unsaturated hydrocarbons having between 2 and 12, and more preferably between 5 and 10 carbon atoms per molecule. Suitable specific examples of readily thermally polymerizable unsaturated hydrocarbons which may be advantageously treated by the process of this invention include methylacetylene; 2-pentyne; 1-octyne; 3-methyl-3-ethyl-1-pentyne; 5-methyl-5-ethyl-3-heptyne; 9-octadecyne; 1,3-hexadiyne; 2,6-octadiyne; phenyl-acetylene; 1-phenyl-1-propyne; 1-methyl-2-vinylbenzene; 1-phenyl-1,3-butadiene; 1,2-divinylbenzene; 1-phenyl-1,3-hexadiene; 1-phenyl-2,3-dimethyl-1,3-butadiene; propadiene; 1,3-butadiene; 3-methyl-1,3-pentadiene; 2,5-dimethyl-1,3-hexadiene; 3-ethyl- 1,3-heptadiene; 1,4-decadiene; 2,6-dimethyl-2,6-nonadiene; 2,3-di-t-butyl-1,3-butadiene; 3,8-diethyl-3,7-decadiene; 4,5-dibutyl-2,6-octadiene; 1,3-cyclopentadiene; 2-methyl-1,3-cyclohexadiene; 1,3-cyclooctadiene; 3-methyl-3-propyl-1,4-cyclopentadiene; 1-methyl-4-propyl-1,3-cyclohexadiene; 1-methyl-4-isopropyl-1,3-cyclohexadiene; 1,3,5-cycloheptatriene; 1,3,5-cyclooctatriene; 1,3,5-heptatriene; 7 - methyl-1,3,7 - nonatriene; 4,7 - dimethyl-3,5,7-decatriene.

The particularly preferred charge stocks of this invention comprise the thermally or catalytically cracked petroleum fractions boiling between 100° F. and 700° F. at atmospheric pressure. For example, it has been found that an excellent charge stock for the process of this invention is the debutanized to 250° F. and the debutanized to 400° F. aromatic distillate cuts of the products from the thermal cracking of at least one low boiling hydrocarbon having between 2 and 4 carbon atoms per molecule, such as a mixture of ethane and propane, to produce ethylene. These charge stocks normally comprise between 15 and 40 weight percent unsaturated compounds which readily thermally polymerize and 60 to 85 weight percent of diluent compounds.

As indicated above, the charge stock can also comprise between about 40 percent and about 94 percent by weight of diluent compounds which do not readily thermally polymerize. These diluent compounds include saturated hydrocarbons, such as paraffins and naphthenes and unsaturated hydrocarbons, such as aliphatic and cyclic monoolefins and aromatics without vinyl substituents. Diluent compounds may also include small amounts of sulfur, nitrogen and oxygen containing hydrocarbons, such as for example mercaptans, disulfides, thiophenes, cyclic thioethers, pyrroles, pyridines, phenols and peroxides. Normally, the amounts of these sulfur, nitrogen and oxygen containing compounds are less than 1 percent and usually between 0.05 and 0.1 weight percent of the charge stock. It is one of the advantages of the process of this invention that the presence of these compounds in the charge stock does not poison the hydrogenation catalyst employed and, in fact, the sulfur, nitrogen and oxygen contents of the charge stock are substantially reduced by treatment in accordance with the teachings of the invention. The diluent compounds normally boil within the same range as the readily thermally polymerizable unsaturated compounds. The diluent hydrocarbons, therefore, normally have between 2 and 20 carbon atoms per molecule.

Examples of diluent compounds include butane; heptane; octane; 4-ethylheptane; 2,6-dimethyldecane; heptadecane; 3-ethyloctadecane; 1-hexene; 3,5-dimethyl-2-hexene; 2,6-dimethyl-1-octene; triisobutylene; 4,5-dipropyl-4-octene; 8-heptadecene; benzene; xylene; butylbenzene; 1 - methyl - 4-isobutylbenzene; 1-phenyl-6-methylheptane; 1,4 - di - isoamylbenzene; 1-phenyltridecane; 1-phenyl-1-butene; 2-phenyl-4-methyl-2-hexene; butylcyclopentane; cyclohexane; octylcyclohexane; dodecylcyclohexane; bicyclohexane; naphthalene; tetralin; thiophene; isobutyl mercaptan; pentamethylene sulfide; 2,3,8-trimethylquinoline; pyridine; phenol; betanaphthol; cyclopentene; 1-propyl - 1 - cyclopentene; 1,2,3-triethyl-1-cyclopentene; 4-methyl - 1 - cyclohexene; 1-methyl-3-isopropyl-1-cyclohexene; 1,3,3,5,5-pentamethyl-4-isopropyl-1-cyclohexene; and 1-methyl-cyclooctene.

It has been found that the readily thermally polymerizable unsaturated compounds are more susceptible to hydrogenation than the aliphatic and cyclic monoolefins or aromatics. Consequently, selective hydrogenation of these readily thermally polymerizable unsaturated compounds can occur, if desired.

In addition to the preheater fouling problems caused by preheating a charge stock comprising between about 6 and about 60 percent by weight of unsaturated compounds which readily thermally polymerize to temperatures greater than about 260° F., these same readily thermally polymerizable compounds can cause fouling problems in the catalytic conversion zone resulting in decreased catalyst life. This additional fouling problem has also now been overcome. It has been found that in a process for the catalytic hydrogenation of a charge stock comprising between about 6 and about 60 weight percent of these unsaturated compounds which readily thermally polymerize, the useful life of a hydrogenation catalyst is extended by maintaining a continuously moving film of liquid over the catalyst. Although it is not certain, it is believed the continuously moving liquid film serves as a wash liquid to wash the catalyst free of polymers as they are formed and also in some degree to promote the saturative hydrogenation rather than the polymerization of these readily thermally polymerizable compounds. This continuously moving liquid film can comprise those diluent compounds in the charge stock which are liquid under reactor conditions and, in addition, any refractory material which is liquid under reaction conditions. It has been found that a continuously moving liquid film is maintained on the catalyst if at least 5 percent by weight of the diluent compounds and refractory material (based on the total weight of the reaction mixture) is in the liquid phase. That is, at least an amount of diluent compounds and refractory material equivalent to 5 percent by weight of the total reaction mixture must be in the liquid phase. By a total reaction mixture is meant the charge stock comprising the readily thermally polymerizable compounds and the diluent compounds and the refractory material. The minimum amount of diluent compounds plus refractory material to be maintained in the liquid phase can easily be calculated by dividing 500 by the summation of the weight percent diluent compounds and refractory material in the total reaction mixture. For example, if the total reaction mixture comprises 25 weight percent readily thermally polymerizable compounds, 25 weight percent diluent compounds and 50 percent refractory material, at least 500 divided by 75 weight percent or 6⅔ weight percent of the diluent compounds and refractory material must be in the liquid phase. It is preferred that between 10 and 80, and more preferably 10 and 100 percent, of the diluent compounds and refractory material be in the liquid phase in the reactor to enhance the washing action. This washing action becomes even more important as the percentage of readily thermally polymerizable compounds in the charge stock increases. Thus, as a general rule, as the percentage of readily thermally polymerizable compounds in the charge stock increases, the percentage of diluent compounds and refractory material maintained in the liquid phase should also increase. It is to be understood that the continuously moving liquid film can be composed entirely of the diluent compounds in the charge stock or the refractory material, if desired. In certain instances the diluent compounds in the charge stock are not sufficiently high boiling to be maintained in the liquid phase under reactor conditions. In one preferred embodiment of this invention the amount and temperature of the refractory material is not only sufficient to supply the direct heat needed to raise the inlet temperature of the charge stock, but is also sufficient to maintain a continuously moving liquid film on the surface of the hydrogenation catalyst to reduce polymer deposits in the hydrogenation zone.

In addition, the temperature through the hydrogenation zone increases due to the exothermic heat of reaction in hydrogenating the readily thermally polymerizable compounds and any aliphatic or cyclic monoolefins in the charge stock. As a result, there is a tendency for additional amounts of the diluent compounds and the refractory material to vaporize as the reaction proceeds. Some vaporization is helpful as a control for reaction temperature but excessive vaporization would impair the maintenance of the continuously moving liquid film. It is therefore a feature of this invention that at least 5 percent by weight, or preferably 10 to 80 percent by weight of the diluent hydrocarbons and refractory material be maintained in the liquid phase at the outlet conditions of the catalytic conversion zone.

The refractory material which can be utilized in the process of this invention comprises any liquid or gaseous material which will not adversely react with the components of the charge stock and which will remain substantially undecomposed under the thermal conditions of the process. Suitable examples of refractory materials which may be employed including saturated hydrocarbons having between 2 and 30 carbon atoms per molecule, such as paraffins and naphthenes; aromatic hydrocarbons having from 1 to 3 rings and between 6 and 30 carbon atoms per molecule and which do not contain vinyl substituents and mixtures of these. Specific examples which are not meant to be limiting of suitable refractory materials include propane; hexane; 2,4-dimethylpentane; nonane; 3-methyl-4-ethylhexane; dodecane; hexadecane; 2-methylheptadecane; eicosane; heptacosane; triacontane; cyclobutane; methylcyclopentane; butylcyclopentane; tetradecylcyclopentane; octylcyclohexane; cyclooctane; cyclododecane; cyclotriacontane; benzene; 1-methyl-2-propylbenzene; 1-phenylhexane; octylbenzene; naphthalene; tetralin; and 1-propyl-naphthalene. It is preferred to employ mixtures of hydrocarbons, such as straight run petroleum fractions or hydrogenated petroleum fractions. It is also preferred that the straight run or hydrogenated petroleum fraction be sufficiently high boiling that it is at least partially in the liquid phase under the conditions existing in the catalytic conversion zone. In general, the refractory material has a boiling range between about 250° F. and 850° F. at atmospheric pressure. The most preferred refractory material will, of course, depend primarily on the type of charge stock which is being treated. For example, in the hydrogenation of a charge stock comprising a mixture of unsaturated hydrocarbons boiling in the gasoline range a suitable refractory material is a straight run or hydrogenated furnace oil boiling between 400° F. and 850° F. at atmospheric pressure. A mixture of hydrocarbons is preferred because a portion of the mixture can be in the vapor phase on admixing with the charge stock and release its heat of condensation in preheating the charge stock by direct heat and, additionally, a portion can vaporize during the reaction to control reaction temperatures.

The amount of refractory material must be at least sufficient to supply the direct heat transfer requirements of the charge stock. This amount will depend on the amount of charge stock to be heated, the temperature rise required, and the temperature of the refractory material. The temperature rise required is the difference between the temperature of the preheated charge stock and the desired inlet temperature to the catalytic conversion zone. The temperature of the preheated charge stock will be 260° F. or less. Preferably, the charge stock is preheated to a temperature between 100° F. and 250° F. and still more preferably to a temperature between 200° F. and 250° F. so as to minimize the temperature rise required. In the instance where hydrogenation of the readily thermally polymerizable unsaturated compounds is the desired reaction, the inlet temperature to the hydrogenation reactor can be between 300° F. and 500° F. with the higher temperatures being employed as the activity of the catalyst decreases. The upper temperature limit for preheating the refractory material is determined by the thermal cracking temperature of this material. The refractory material is preferably heated to a temperature between about 500° F. and 780° F. and still more preferably to a temperature between 550° F and 650° F. to avoid localized over-heating upon admixing of the refractory material with the preheated charge stock. It has been found that a volume ratio of refractory material to the charge stock of about 0.5:1 gives satisfactory results for the hydrogenation of gasoline boiling range charge stocks preheated to 250° F. using a straight run furnace oil preheated to 550° F. as the refractory material. In general, the amount of refractory material can vary from a volume ratio of refractory material to charge stock of about 0.2:1 to 40:1, or higher, with preferred ratios between 0.25:1 and 10:1.

The refractory material is preferably admixed with the partially preheated charge stock just prior to contacting the partially preheated charge with a catalyst mass in a catalytic conversion zone so that both the preheated charge stock and refractory material in admixture contact the catalyst mass in the catalytic conversion zone. The admixing of the refractory material and charge stock should take place as close to the point of contact between the admixture and the catalyst mass as feasible to obtain proper mixing while providing as little time as possible for promoting thermal polymerization. It has been found that the time between admixing of the preheated refractory material and contact of the admixture with the catalyst mass in the catalytic conversion zone should be less than 2 minutes, preferably between 10 and 60 seconds, and more preferably between 10 and 30 seconds. The admixing can occur by any suitable means, such as for example, simple admixture in the common transfer line, by use of a mixing nozzle or other suitable device in the transfer line, or by injecting or spraying of the charge stock into a stream of hot liquid refractory material. This latter method could be employed after the refractory material has entered the reactor, but before it has contacted a catalyst mass or, if there are a number of catalyst masses arranged in beds in the reactor, then the charge stock could be injected or sprayed into the stream of refractory material between the catalyst beds. The important criteria are using the refractory material to preheat the charge stock, and having a sufficient amount of the refractory material in the liquid phase to reduce the polymer deposit on the catalyst.

In one preferred embodiment of this invention, the preheated admixture is contacted with a hydrogenation catalyst in a hydrogenation zone in the presence of hydrogen under mild conditions such that the unsaturated compounds which readily thermally polymerize are selectively saturated. Any suitable hydrogenation catalyst known in the art can be employed, such as at least one of the metals from Groups VI and the Iron Group metals from Group VIII of the Periodic Table, their oxides or sulfides. These metals include Cr, Mo, W, Fe, Co and Ni, their oxides or sulfides. The preferred catalyst comprises Mo in combination with Co and Ni. It is preferred that the metals be supported and still further preferred that the support be a non-cracking type support such as alumina, silica, steam deactivated silica-alumina, magnesia and others. These catalysts are very stable and have the additional advantage of being resistant to poisoning by sulfur and nitrogen in the charge stock or refractory material. The total amount of metal desposited on the support is usually from 5 to 30 weight percent calculated as the metal with preferred amounts between 9 and 15 weight percent.

The hydrogenation conditions are mild. Reaction temperatures can be between 300° F. and 650° F. with preferred temperatures between 350° F. and 600° F. The partial pressure of hydrogen can be between 200 and 1200 p.s.i.g. and preferably between 330 and 800 p.s.i.g. Total reaction pressures greater than about 1200 p.s.i.g. are not desirable since polymerization is promoted at the higher pressures as is saturation of aromatic type hydrocarbons which may be in the charge stock. It is one of the features of this invention that essentially no saturation of aromatic compounds in the charge stock or refractory material occurs, that is, the reaction conditions and catalyst are such that less than 2 percent of any aromatics in the charge stock or refractory material are saturated.

Reaction space velocity in volumes of charge per volume of catalyst per hour can be between about 0.5 and 10 or more with preferred space velocities between 1 and 4. Space velocity is correlated with reaction temperature and pressure to obtain the desired degree of saturation. In general, as the reaction temperature increases, the space velocity also increases.

The hydrogen recycle rate can be between 1500 and 10,000 s.c.f./bbl. or more with preferred amounts between 3000 and 7000 s.c.f./bbl. Hydrogen purity is not critical and can be between 30 and 100 percent but it is preferred that the hydrogen stream be between 50 and 100 percent hydrogen.

The invention will now be described with reference to the attached drawing which discloses one preferred embodiment of this invention. Referring now to the drawing, a light hydrocarbon gas such as ethane or propane is passed through line 10 to thermal cracker 12 which is operated at a temperature of about 1450° F. to 1550° F. The products from the cracker pass through line 13 where they are quenched with water from line 14 to a temperature of about 550° F. The products pass into a quench tower 15 where additional water is added through line 16. Gaseous products pass overhead from quench tower 15 at a temperature, for example, of about 110° F. through line 17 to compressors 18 and thence via line 19 at a temperature of about 240° F., to the caustic washtower 24 which removes carbon dioxide with the caustic wash out the bottom of the tower 24 via line 26. Liquid from tower 15 is passed by line 20 to quench drum 21 wherein an aromatic distillate boiling at about 130° F. to 700° F. is removed via line 22. The quench drum 21 is vented via line 23 into line 17. The washed gases pass through line 28 to a preheater 30 where they are preheated to a temperature which is normally between 270° F. and 325° F. and thence through line 32 into the hydrogenation unit 34 which is operated at a temperature between 320° F. and 375° F. and a flow rate between 1000 and 2500 ft.$^3$/hr./ft.$^3$ of catalyst bed for the selective hydrogenation of acetylene. These washed gases comprise 15 to 18 percent hydrogen; 22 to 28 percent methane; 36.0 to 45.0 percent ethylene-ethane; 12.0 to 17.0 percent propylene-propane; 1 to 2 percent butylene-butane; 0 to 2 percent CO; 0 to 2.0 percent $N_2$; 0.2 to 1 percent $C_5$ and $C_6$; and 0.2 to about 5 percent acetylene, higher boiling acetylenes; diolefins and other readily thermally polymerizable compounds. No preheater fouling problems for preheater 30 have been observed. The products from the hydrogenation unit 34 are passed via line 36 to a separation complex such as a distillation column 38 where various hydrocarbon number fractions, such as an ethane-ethylene fraction, can be removed and separately treated for further purification. The debutanized residue removed through line 40 is an aromatic distillate boiling between about 100° F. and 400° F. and comprises between about 5 and 60 weight percent aromatics; between about 10 and 20 percent monoolefins; between 15 and 30 percent diolefins, triolefins or acetylenes, and 5–15 percent paraffins and naphthenes.

This aromatic distillate because of the high concentration of materials which readily thermally polymerize is unsuitable for blending as a motor fuel or the recovery of aromatics. The aromatic distillate can, however, be successfully treated by the method of this invention.

The aromatic distillate is passed by line 40 through the steam preheater 42 where it is prheated to a maximum temperature of about 260° F. A heavy straight run distillate fuel oil boiling between 550° F. and 680° F. and substantially free of olefinic hydrocarbons is passed through line 44, admixed with hydrogen recycle gas from line 46 and the mixture is preheated separately in preheater 48 to a temperature in excess of 300° F. The heavy distillate fuel oil is then passed from heater 48 through line 50 where it is admixed with the preheated aromatic distillate entering through line 52 and the mixture enters the top of the hydrogenation reactor 54. The hydrogenation reactor 54 is maintained at a total pressure such that the hydrogen partial pressure is between 300 and 800 p.s.i.g. The reaction temperature is maintained generally between 350° F. and 750° F. The products leave the hydrogenation reactor 54 by line 56 and are cooled in 58 bfeore passing via line 60 to the high pressure separator 62. Recycle gas passes from 62 via line 46 to join the heavy distillate fuel oil before the preheater 48. Make-up gas enters through line 64. Liquid products from the hydrogenation reactor 54 are removed from 62 through line 66 and sent for fractionation.

The invention will be further described with reference to the following specific examples.

EXAMPLE 1

An aromatic distillate obtained as a product from the thermal cracking of a mixture of ethane and propane and having the characteristics as shown in Table I below was preheated by indirect heat exchange to a temperature of about 250° F. A mixture of recycle gas (78.9 percent hydrogen) and hydrogenated products (refractory material) was preheated to 580° F. and admixed with the aromatic distillate charge stock to give a resulting mixture having a temperature of about 410° F. The ratio of the hydrogenated products to the preheated aromatic distillate charge was 1.37:1. The resulting mixture after flash separation of minor amounts of liquid components was charged downflow at a reactor temperature of 612° F. entirely in the vapor phase through a bed of a presulfided catalyst comprising 0.2 percent nickel, 1.7 percent cobalt and 9.5 percent molybdenum on an alumina support. The run conditions and product inspections are also given in Table I below.

After 14.5 days of operation the cayalyst began to deactivate rapidly until at an age of 16.1 days the bromine number on products was 59.3. This increase in bromine number indicated the olefins were not being converted to paraffins. Examination of the catalyst showed the presence of a heavy polymer. No preheater fouling problems were noted after 16.1 days of operation.

EXAMPLE 2

Example 1 was repeated with a presulfided catalyst comprising 2.3 percent nickel, 1.2 percent cobalt and 10.8 percent molybdenum on alumina except the reactor temperature was lowered to 570° F., the recycle hydrogenate (refractory material) was reduced to a liquid hourly space velocity of 0.91, and a hydrogenated FCC furnace oil, additional refractory material (whose inspections are given in Table I), was injected onto the top of the catalyst bed at a temperature of 430° F. and at the rate of 0.5 volume of furnace oil per volume of catalyst per hour. The run conditions and inspections of the hydrogenated aromatic distillate after 471 hours of operation are given in Table I below. Under the conditions in the reactor the furnace oil was substantially entirely in the liquid phase. This run was continued for a total reaction time of 43 days at which time the bromine number of product had only increased to 1.5 indicating the catalyst was still active.

A comparison of Example 2 with Example 1 shows that an extended catalyst life can be achieved by maintaining the desired continuously moving liquid film over the surface of the catalyst. The data in Table I also show that sulfur in the charge stock is essentially completely removed.

*Table I.—Hydrogenation of aromatic distillate*

| Example No | | 1 | 2 | |
|---|---|---|---|---|
| Catalyst age: Hours of operation at end of period | | 109 | 471 | |
| Operating conditions: | | | | |
| Reactor temperature ° F., (average) | | 612 | 570 | |
| Reactor pressure, p.s.i.g | | 600 | 600 | |
| Space velocity, vol./hr./vol.: | | | | |
| Fresh feed | | 0.86 | 0.86 | |
| Recycle hydrogenate | | 1.18 | 0.91 | |
| Hydrogenated FCC furnace oil | | | 0.50 | |
| Gas circulation: Scf./bbl. of total feed | | 3,920 | | |
| Percent $H_2$ | | 78.9 | | |

| | Charge | Product | | Hydrogenated FCC furnace oil |
|---|---|---|---|---|
| Inspections— | | | | |
| Hydrogenated charge: | | | | |
| Gravity, ° API | 42.9 | 51.9 | 49.4 | 29.2 |
| Bromine No., ASTM D1159 | 109.0 | 0.1 | 1.38 | |
| Hydrocarbon type analysis, percent by Vol.: | | | | |
| Paraffins | 7.7 | 26.2 | | |
| Cycloparaffins/monoolefins | 17.6 | 31.7 | | |
| Cyclo-olefins, diolefins, acetylenes | 17.0 | 0.0 | | |
| Cyclo-diolefins, triolefins | 11.2 | | | |
| Benzene | 35.3 | 32.9 | | |
| Toluene | 7.4 | 6.8 | | |
| $C_8$ alkylbenzene | 1.2 | 1.9 | | |
| $C_9$ alkylbenzene | 0.2 | 0.4 | | |
| $C_{10}$ | | 0.1 | | |
| Indanes/styrenes | 2.4 | | | |
| Sulfur, p.p.m | 750 | <1 | <1 | |
| Distillation, gasoline ASTM D86, ° F.: | | | | |
| Over point | 110 | 116 | 123 | 431 |
| End point | 369 | 420 | 361 | 604 |
| 10% at | 134 | 134 | 142 | 462 |
| 50% at | 173 | 156 | 164 | 498 |

EXAMPLE 3

An aromatic distillate obtained as a product from the thermal cracking of a mixture of ethane and propane and having the characteristics shown in Table II below was preheated by indirect heat to a temperature of 250° F. A mixture of reactor charge gas (73.8 percent hydrogen) and a heavy straight run distillate furnace oil were preheated to 555° F. and admixed at the rate of 0.5 volume of furnace oil per volume of catalyst per hour with the preheated aromatic distillate in the inlet pipeline just prior to the hydrogenation reactor. The resulting mixture at a temperature of about 470° F. was charged downflow through a bed of a presulfided catalyst comprising 2.3 percent nickel, 1.2 percent cobalt and 11.0 percent molybdenum on an alimunia support. The run conditions and inspections for the heavy straight run furnace oil and hydrogenated aromatic distillate are also given in Table II below. Inspections of the furnace oil show that over 95 percent of the sulfur was removed. Thus a straight run furnace oil can be successfully desulfurized while serving as a refractory material.

*Table II.—Hydrogenation of an aromatic distillate*

| Example No | | 3 | 4 | | |
|---|---|---|---|---|---|
| Catalyst age: Days | | 39 | 23 | | |
| Operating conditions: | | | | | |
| Reactor inlet, °F | | 469 | 422 | | |
| Reactor average temperature, °F | | 581 | 590 | | |
| Space velocity, vol./hr./vol. total | | 1.97 | 2.07 | | |
| Aromatic Distillate | | 0.99 | 1.05 | | |
| Heavy distillate furnace oil: | | | | | |
| Inlet | | 0.98 | 0.51 | | |
| Injection | | | 0.51 | | |
| Reactor pressure, p.s.i.g | | 600 | 600 | | |
| Reactor gas charge rate, scf./bbl. of total liquid feed | | 4,031 | 3,918 | | |

| | Aromatic distillate | | | Heavy distillate | |
|---|---|---|---|---|---|
| | | | | Charge | Product |
| Inspection Data: | | | | | |
| Gravity, °API | 49.7 | 45.8 | 45.3 | 35.8 | 35.9 |
| Bromine number | 86.4 | 1.1 | 0.5 | 0.8 | 0.4 |
| Sulfur, p.p.m | | | | 730 | 30 |
| Hydrocarbon type analysis, vol. percent: | | | | | |
| Paraffins | 14.5 | | | | |
| Cyclo-paraffins/Monoolefins | 23.7 | | | | |
| Cyclo-diolefins/diolefins/acetylenes | 20.8 | | | | |
| Cyclo-diolefins/Triolefins | 3.6 | | | | |
| Indanes/styrenes | 1.6 | | | | |
| Benzene | 28.0 | | | | |
| Toluene | 5.6 | | | | |
| C8 alkylbenzenes | 1.8 | | | | |
| C9 alkylbenzenes | 0.4 | | | | |
| Distillation, °F.: | | | | | |
| IBP | 106 | | | 347 | 488 |
| EP | 352 | | | 650 | 648 |
| 10% at | 128 | | | 510 | 522 |
| 50% at | 161 | | | 563 | 560 |

The efficient hydrogenation of the readily thermally polymerizable unsaturated compounds occurs generally at lower reaction temperatures than the hydrogenation of monoolefins. By the term monoolefins is meant any aliphatic or cyclic monoolefin. For example, the efficient hydrogenation of readily thermally polymerizable unsaturated compounds occurs at temperatures between about 350° F. and 500° F. depending on the activity of the catalyst while the temperature required for the efficient hydrogenation of monoolefins is above about 500° F. and usually between 525° F. and 650° F. For charge stocks which comprise both monoolefins and readily thermally polymerizable unsaturated compounds, the readily thermally polymerizable unsaturated compounds hydrogenate initially which tends to increase the reaction temperature due to the exothermic heat of reaction and promote the hydrogenation of the monoolefins. In certain instances, such as the preparation of charge stocks for a reforming reaction or the recovery of aromatics from olefin-aromatic streams by extraction with a solvent such as ethylene glycol, it is desirable to substantially completely hydrogenate both the readily thermally polymerizable unsaturated compounds and the monoolefins. By substantially completely hydrogenate is meant to hydrogenate so that the product has a bromine number by ASTM test D1159 of less than one, and preferably between 0.1 and 0.5. It is preferred to achieve this saturation of both the readily thermally polymerizable unsaturated compounds and the monoolefins in one reactor. It has been found, however, that where the higher ratios of refractory material to charge stock are employed, or where the weight percent of readily thermally polymerizable unsaturated compounds is too low, the temperature rise of the reaction mixture due to the hydrogenation of the readily thermally polymerizable unsaturated compounds is insufficient to efficiently hydrogenate the monoolefins in the remaining portion of the reactor. This then necessitates the use of a two reactor system to substantially completely saturate the monoolefins. Increasing the reactor inlet temperature of the first reactor has been found to be undesirable as the catalyst in the initial portion of the bed tends to age much more rapidly at increased inlet temperatures.

In accordance with the invention, the efficient hydrogenation of a charge stock comprising a monoolefin and at least six weight percent of readily thermally polymerizable compounds, but less than that amount of readily thermally polymerizable unsaturated compounds necessary to increase the temperature of the charge stock due to the hydrogenation of the readily thermally polymerizable unsaturated compounds to efficiently hydrogenate the monoolefins, is achieved in one reactor by a process which comprises preheating the charge stock to a temperature less than about 260° F., admixing a first preheated refractory material with said charge stock, contacting said admixture with a hydrogenation catalyst in a hydrogenation zone under hydrogenation conditions including temperatures between 350° F. and 750° F., said first refractory material being admixed with the charge stock just prior to contacting said admixture with the hydrogenation catalyst in said hydrogenation zone, and injecting a second preheated refractory material into the hydrogenation zone at a point wherein the hydrogenation of the readily thermally polymerizable unsaturated compounds is substantially complete to form a total reaction mixture. The amount and temperature of the first refractory material is sufficient to increase the temperature of the admixture to between 300° F. and 480° F. before entry into the reactor and to maintain a continuously moving liquid film on the hydrogenation catalyst to reduce polymer formation in said hydrogenation zone. The amount and temperature of the second refractory material is sufficient to increase the temperature of the total reaction mixture to between 510° F. and 600° F.

Whether a second preheated refractory material is required to be injected into the reactor at a point downstream of the inlet to the hydrogenation zone will depend, as noted above, on whether the required temperature rise is achieved from the exothermic heat obtained by hydrogenation of the readily thermally polymerizable unsaturated compounds in the charge stock. The amount of heat evolved for the hydrogenation of the readily thermally polymerizable unsaturated compounds depends upon the type of readily thermally polymerizable unsaturated compounds and, of course, the amount in the charge stock. It is a simple matter of experimentation for any particular charge stock using a desired type and amount of refractory material to determine whether injection of a second preheated refractory material is required to increase the temperature of the reaction mixture to efficiently hydrogenate the monoolefins in the charge stock. For example, it has been found that for the substantially complete saturative hydrogenation of the readily thermally polymerizable unsaturated compounds and monoolefins in a debutanized to 400° F. aromatic distillate from the thermal cracking of a mixture of ethane and propane and using a 1:1 molar ratio of a straight run furnace oil as the refractory material, a second stream of refractory material is required when the percentage of readily thermally polymerizable unsaturated compounds in the charge stock is between about 6 and about 25 weight percent.

In general, it is preferred to employ a preheated second refractory material for the hydrogenation of a charge stock comprising between about 6 and about 30 weight percent of readily thermally polymerizable unsaturated compounds and between about 70 and about 94 weight percent of diluent compounds wherein between about 5 and 100 weight percent of said diluent compounds are monoolefins. The diluent compounds are as defined above. The readily thermally polymerizable unsaturated compounds are also as defined above. The preferred charge stock comprises between about 10 and about 25 weight percent readily thermally polymerizable unsaturated compounds and between about 75 and 90 weight percent diluent compounds, wherein between about 5 and 50 weight percent of said diluent compounds are mono-olefins; between 5 and 90 weight percent of said diluent compounds are aromatics; and between 5 and 90 weight percent of said diluent compounds are other diluent compounds as defined above, such as paraffins and naphthenes.

The composition of the second refractory material can be the same as the refractory material defined above. The amount of the refractory material which is to be injected at a point downstream of the inlet to the hydrogenation zone should be sufficient to increase the temperature of the total reaction mixture to a temperature at which the efficient hydrogenation of the monoolefins will occur. In general, this temperature is between 510° F. and 600° F. with preferred temperatures between 525° F. and 580° F. The exact amount of the second refractory material to employ will depend upon the amount of material to be heated, the temperature rise required and the temperature of the second refractory material.

The temperature of preheating the second refractory material can be between 550° F. and 780° F. The upper limit is determined so as to avoid thermal cracking of the material. It is preferred that the refractory material be heated to temperatures between 650° F. and 725° F. Usually the amount of refractory material is such that the weight percentage of the second refractory material in the total reaction mixture is between about 5 and 40.

The second refractory material is injected into the hydrogenation zone at a point downstream of the inlet to the hydrogenation zone where the hydrogenation of the readily thermally polymerizable unsaturated compounds is substantially complete. By substantially complete hydrogenation of the readily thermally polymerizable unsaturated compounds is meant hydrogenation so that the weight percent of the readily thermally polymerizable unsaturated compounds in the reaction mixture is less than about 6. For charge stocks comprising between about 6 and about 25 weight percent readily thermally polymerizable unsaturated compounds, this point of injection in the hydrogenation zone is usually between about 5 and 40 and preferably between the 20 and 30 percent point downstream of the inlet to or top of the hydrogenation catalyst bed. The hydrogenation catalyst bed may, of course, comprise one or more beds in a single reactor.

Referring again to FIGURE I, a portion of the heavy distillate furnace oil is passed through valve 68 and line 69 to preheater 70 where it is preheated to a temperature between 650° F. and 725° F. The preheated oil then passes through line 72 into the hydrogenation reactor 54.

This invention will be further described with reference to the following additional examples.

EXAMPLE 4

An aromatic distillate obtained as a product from the thermal cracking of a mixture of ethane and propane and having the inspections as shown in Table II above was preheated indirectly to a temperature of 250° F. A mixture of a straight run furnace oil (0.5 liquid hourly space velocity) and reactor charge gas was preheated to a temperature of 555° F. and admixed with the preheated aromatic distillate in the inlet line just prior to the hydrogenation reactor. The inspections of the furnace oil are also given in Table II above. The resulting mixture at a temperature of about 420° F. was charged downflow through a bed of a hydrogenation catalyst comprising 2.3 percent nickel, 1.2 percent cobalt and 11.0 percent molybdenum on an alumina base. At 25 percent catalyst bed depth a second stream of the straight run furnace oil (0.5 liquid hourly space velocity) at a temperature of 690° F. was injected to maintain the temperature at 550° F. at this point. The hydrogenation unit was operated under a total pressure of 600 p.s.i.g. Under these reactor conditions, the furnace oil was substantially completely in the liquid phase. The bromine number of the product was 0.5 indicating substantially complete saturation of the non-aromatic materials in the charge stock. Run conditions and product inspections are given in Table II above.

Comparing Example 4 with Example 3 shows that even with a lower inlet temperature of 420° F., the product from using the split-stream method of adding the refractory material has a bromine number less than one which is desired for charge stocks to solvent extraction units to selectively recover the aromatics. In addition, the use of higher inlet temperatures as in Example 3 tend to age the hydrogenation catalyst more quickly.

In the examples described above, the preheated charge stock and refractory material were charged downflow in a co-current fashion through the hydrogenation catalyst bed. If the charge stock is substantially completely in the vapor phase, a counter-current type of operation can be employed by preheating the charge stock to a temperature less than about 260° F. admixing a gaseous refractory material to increase the temperature of the admixture to the desired inlet temperature and charging the admixture upflow through the catalyst bed while charging a second refractory material downflow, said second refractory material being substantially entirely in the liquid phase and being charged at a liquid hourly space velocity between 0.1 and 2.0 and preferably between 0.5 and 1.0 so as to keep a continuously moving liquid film on the surface of the catalyst.

Resort may be had to such variations and modifications as fall within the spirit of the invention and the scope of the appended claims.

We claim:

1. An improved process for the hydrogenation of a charge stock comprising the debutanized to 400° F. fraction from the thermal cracking of at least one low boiling hydrocarbon having between 2 and 4 carbon atoms per molecule to produce ethylene which comprises:
   (1) preheating said charge stock to a temperature less than 260° F.;
   (2) admixing a preheated refractory material boiling between 400° F. and 850° F. at atmospheric pressure with said charge stock;
   (3) passing said admixture downflow over a hydrogenation catalyst selected from the group consisting of the metals from Group VI and the Iron Group metals from Group VIII of the Periodic Table, their oxides and sulfides, supported on a non-cracking base in a hydrogenation zone under hydrogenation conditions including a temperature between 350° F. and 750° F.;
   (4) said refractory material being admixed with said charge stock just prior to passing said admixture downflow over said hydrogenation catalyst; and
   (5) wherein the volume ratio of said refractory material to said charge stock is between 0.2:1 and 40:1 and wherein the refractory material is preheated to a temperature between 500° F. and 780° F., the amount and temperature of said refractory material being sufficient to increase the temperature of said admixture to between 300° F. and 500° F. and to maintain a continuously moving liquid film on the hydrogenation catalyst to reduce polymer formation in said hydrogenation zone.

2. A process according to claim 1 wherein said refractory material is a straight run furnace oil fraction and wherein said charge stock is preheated to a temperature between 200° F. and 260° F.

3. An improved process for the hydrogenation of a charge stock comprising a mono-olefin and at least 6 weight percent of readily thermally polymerizable unsaturated compounds but less than that amount of readily thermally polymerizable unsaturated compounds necessary to increase the temperature of the charge stock due to the hydrogenation of the readily thermally polymerizable unsaturated compounds to efficiently hydrogenate the mono-olefins which comprises:

(1) preheating said charge stock to a temperature less than 260° F.;
(2) admixing a first preheated refractory material with said charge stock;
(3) passing said admixture downflow over a hydrogenation catalyst in a hydrogenation zone under hydrogenation conditions including a temperature between 350° F. and 500° F.;
(4) said first refractory material being admixed with said charge stock just prior to contacting the charge stock with the hydrogenation catalyst in said hydrogenation zone;
(5) and injecting a second preheated refractory material into said hydrogenation zone at a point wherein the hydrogenation of said readily thermally polymerizable unsaturated compounds is substantially complete to form a total reaction mixture;
(5a) passing said total reaction mixture downflow over a hydrogenation catalyst in a hydrogenation zone under hydrogenation conditions including a temperature above about 500° F. to substantially completely hydrogenate said mono-olefins;
(6) the amount and temperature of said first refractory material being sufficient to increase the temperature of said admixture to between 300° F. and 480° F. and to maintain the continuously moving liquid film on the hydrogenation catalyst to reduce polymer formation in said hydrogenation zone; and
(7) the amount and temperature of said second refractory material being sufficient to increase the temperature of the total reaction mixture to between 510° F. and 600° F.

4. A process according to claim 3 wherein the charge stock comprises between about 6 and 30 weight percent of readily thermally polymerizable unsaturated compounds and between about 70 and about 94 weight percent of diluent compounds wherein between about 5 and 100 weight percent of said diluent compounds are mono-olefins.

5. A process according to claim 4 wherein the second preheated refractory material is injected into said hydrogenation zone at a point between about 5 and about 40 percent downstream of the inlet to the hydrogenation catalyst.

6. A process according to claim 5 wherein the charge stock comprises a thermally cracked petroleum fraction boiling between 100° F. and 700° F. at atmospheric pressure, and wherein said first and said second refractory material comprise a straight run petroleum fraction boiling between 550° F. and 850° F. at atmospheric pressure.

7. A process according to claim 6 wherein the charge stock comprises the debutanized to 400° F. fraction from the thermal cracking of a mixture of ethane and propane to produce ethylene.

8. An improved process for the hydrogenation of a charge stock boiling between 100° F. and 400° F. and comprising between 6 and about 60 weight percent of unsaturated compounds which readily thermally polymerize which comprises:

(1) preheating said charge stock to a temperature less than about 260° F.;
(2) admixing a first preheated refractory material with said charge stock;
(3) passing said admixture downflow over a hydrogenation catalyst in a hydrogenation zone under hydrogenation conditions including a temperature between 350° and 750° F.;
(4) said first refractory material being admixed with said charge stock just prior to passing said admixture downflow over said hydrogenation catalyst;
(5) said refractory material being preheated to a temperature higher than the temperature of said charge stock, the amount and temperature of said first refractory material being sufficient to increase the temperature of said admixture to between 300° and 500° F.; and
(6) passing a second preheated refractory material boiling between 400° F. and 850° F. at atmospheric pressure concurrent with said admixture downflow through said hydrogenation zone to maintain a continuously moving liquid film on the hydrogenation catalyst to reduce polymer formation in said hydrogenation zone.

9. A process according to claim 8 wherein said charge stock is preheated to a temperature between 100° and 250° F.

10. A process according to claim 8 wherein said charge stock is preheated to a temperature between 200° and 250° F.

11. An improved process for the hydrogenation of a charge stock boiling between 100° F. and 400° F. and comprising between 6 and about 60 weight percent of unsaturated compounds which readily thermally polymerize which comprises:

(1) preheating said charge stock to a temperature less than about 260° F.;
(2) admixing a preheated refractory material boiling between 400° F. and 850° F. at atmospheric pressure with said charge stock;
(3) passing said admixture downflow over a hydrogenation catalyst in a hydrogenation zone under hydrogenation conditions including a temperature between 350° and 750° F.;
(4) said refractory material being admixed with said charge stock just prior to passing said admixture downflow over said hydrogenation catalyst;
(5) said refractory material being preheated to a temperature higher than the temperature of said charge stock the amount and temperature of said refractory material being sufficient to increase the temperature of said admixture to between 300° and 500° F. and to maintain a continuously moving liquid film on the hydrogenation catalyst to reduce polymer formation in said hydrogenation zone.

12. A process according to claim 11 wherein said charge stock is preheated to a temperature between 100° and 250° F.

13. A process according to claim 11 wherein said charge stock is preheated to a temperature between 200° and 250° F.

14. A process according to claim 11 wherein said charge stock is the debutanized to 250° F. aromatic distillate cut of the product from the thermal cracking of at least one low boiling hydrocarbon having between 2 and 4 carbon atoms per molecule.

15. A process according to claim 11 wherein the refractory material is preheated to a temperature between 500° F. and 780° F. and wherein the volume ratio of refractory material to preheated charge stock is between 0.2:1 and 40:1.

16. A process according to claim 11 wherein between 10 and 80 percent by weight of the diluent compounds and refractory material are maintained in the liquid phase at the outlet conditions of the hydrogenation zone.

17. An improved process for the hydrogenation of a charge stock boiling between 100° F. and 400° F. and comprising between 6 and about 60 weight percent of unsaturated compounds which readily thermally polymerize which comprises:

(1) preheating said charge stock to a temperature less than about 260° F.;
(2) admixing a preheated refractory material boiling between 400° F. and 850° F. at atmospheric pressure with said charge stock;
(3) passing said admixture downflow over a hydrogenation catalyst in a hydrogenation zone under hydrogenation conditions including a temperature between 350° F. and 750° F. to selectively hydrogenate said unsaturated compounds which readily thermally polymerize;

(4) said refractory material being admixed with said charge stock just prior to pasing said admixture downflow over said hydrogenation catalyst;

(5) said refractory material being preheated to a temperature higher than the temperature of said charge stock, the amount and temperature of said refractory material being sufficient to increase the temperature of said admixture to between 300° F. and 500° F. and to maintain a continuously moving liquid film on the hydrogenation catalyst to reduce polymer formation in said hydrogenation zone.

18. An improved process for the catalytic conversion of a charge stock boiling between 100° F. and 400° F. and comprising between 6 and 60 weight percent of unsaturated compounds which readily thermally polymerize which comprises:

(1) preheating said charge stock to a temperature less than about 260° F.;

(2) admixing a preheated refractory material with said preheated charge stock to further increase the temperature of said charge stock;

(3) contacting said admixture with a catalyst mass catalyst in a hydrogenation zone;

(4) said refractory material being preheated to a temperature between 500° F. and 780° F.;

(5) the amount of said refractory material being sufficient to increase the temperature of said admixture to between 300° F. and 500° F.; and (6) said refractory material being admixed with said charge stock just prior to contacting said admixture with said catalyst mass.

19. An improved process for the hydrogenation of a charge stock boiling between 100° F. and 400° F. and comprising between 6 and 60 weight percent of unsaturated compounds which readily thermally polymerize which comprises:

(1) preheating said charge stock to a temperature less than about 260° F.;

(2) admixing a preheated refractory material with said preheated charge stock to further increase the temperature of said charge stock;

(3) contacting said admixture with a hydrogenation catalyst in a hydrogenation zone;

(4) said refractory material being preheated to a temperature between 500° F. and 780° F.;

(5) the amount of said refractory material being sufficient to increase the temperature of said admixture to between 300° F. and 500° F.; and (6) said refractory material being admixed with said charge stock just prior to contacting said admixture with said catalyst mass.

20. A process according to claim 19 wherein the charge stock comprises the debutanized to 400° F. fraction from the thermal cracking of at least one low boiling hydrocarbon having between 2 and 4 carbon atoms per molecule to produce ethylene and the refractory material comprises a petroleum fraction boiling between 250° F. and 850° F. at atmospheric pressure.

References Cited by the Examiner
UNITED STATES PATENTS 3,094,481 6/63 Butler et al. _____ 208—255
3,124,526 3/64 Butler et al. _____ 208—255

DELBERT E. GANTZ, *Primary Examiner.*

ALPHONSO D. SULLIVAN, *Examiner.*